United States Patent [19]
Soffici

[11] Patent Number: 5,564,363
[45] Date of Patent: Oct. 15, 1996

[54] PET FOOD DISH WITH CRAWLING INSECT BARRIERS

[76] Inventor: Alex R. Soffici, 1066 Diamond Crest, Santa Barbara, Calif. 93110

[21] Appl. No.: 422,137

[22] Filed: Apr. 13, 1995

[51] Int. Cl.⁶ .................................................. A01K 5/01
[52] U.S. Cl. ............................................. 119/61; D30/130
[58] Field of Search ........................... 119/61, 51.5, 73, 119/74; D30/121, 129, 130, 131

[56] References Cited

U.S. PATENT DOCUMENTS

| | | | |
|---|---|---|---|
| D. 57,212 | 3/1921 | Carter | D30/129 |
| D. 326,742 | 6/1992 | Tart | D30/130 |
| 2,367,491 | 1/1945 | Ferguson | 119/61 |
| 3,015,307 | 1/1962 | Johnson | 119/61 |
| 3,253,576 | 5/1966 | Tvedten | 119/61 |
| 4,357,905 | 11/1982 | Carpenter | 119/61 |
| 4,532,891 | 8/1985 | Jones | 119/51 |
| 4,896,627 | 1/1990 | Riddell | 119/51.5 |
| 5,113,798 | 5/1992 | Rera | 119/61 |
| 5,138,980 | 8/1992 | Ewing | 119/73 |
| 5,205,242 | 4/1993 | Kesselman | 119/61 |
| 5,253,609 | 10/1993 | Partelow | 119/61 |
| 5,277,149 | 1/1994 | East | 119/51.5 |
| 5,284,173 | 2/1994 | Graves et al. | 119/74 |
| 5,297,504 | 3/1994 | Carrico | 119/61 |

*Primary Examiner*—Todd E. Manahan
*Attorney, Agent, or Firm*—Lyon & Lyon

[57] ABSTRACT

A single piece, single mold pet food dish designed for adaptation to out of doors environments where ants and other crawling insects tend to infect and degrade the food therein has a water moat barrier formed between corrugated and alternating ridged rims, thereby effecting a superior elevational barrier to insect travel. In a preferred embodiment, a fluid inlet and fluid outlet port are provided to allow water in the moat to be in constant circulation.

2 Claims, 2 Drawing Sheets

PET FOOD DISH WITH CRAWLING INSECT BARRIERS

BACKGROUND OF THE INVENTION

1. Field of the Invention

The invention disclosed herein relates to domestic animal feed dishes. More specifically, the invention describes a cat and dog food dish designed for out of doors use with crawling insect inhibiting characteristics to prevent insect contamination of the solid or liquid pet food dispensed and contained in the dish in an out of doors environment where crawling insects such as ants are more likely to be encountered.

2. Description of the Prior Art

A great variety of domestic pet food dishes have been conceived and exist in the prior art, some of which are designed with the specific intent to prevent crawling insects such as ants from attacking and infecting the food held in outside pet food containers for an extended period of time. One such prior art designed as an insect inhibiting pet food container is illustrated in the Kasselman patent, U.S. Pat. No. 5,205,242, which describes a single feed bowl suspended above a moat of water by a pedestal centrally positioned in a lower, concentric bowl. It is conceived that the moat of water disposed in the lower bowl would inhibit if not prevent ants from getting to the food in the upper bowl. The upper bowl is removable and is configured with a lengthy overlapping edge to further inhibit the travel of any ants that might survive the swim across the moat.

Another and similar insect retardant pet food dish is found in the Partelow patent, U.S. Pat. No. 5,253,609, where a feed bowl is likewise removably suspended by a centrally positioned pedestal disposed within a lower bowl of water to provide an insect inhibiting moat. Indeed, a similar extended overhanging edge of the upper bowl is provided to further inhibit travel of ants that survive the swim across the moat. In addition, Partelow suggests an additional ant barrier in the form of a centrally disposed third bowl providing a separate moat within the larger external moat of the lower bowl. The walls of each upper, lower and central bowl are all inclined back over the moat to further inhibit travel of ants up the outside wall, down the inside wall, across the moat, etc.

A more elementally designed insect repelling pet food dish is found in Carpenter, U.S. Pat. No. 4,357,905, where a double bowled pet dish is conceived with the water from a water bowl on one side of the dish is channeled to the solid food side in which is suspended a solid food bowl. In short, the solid food bowl is surrounded by a moat of water sustained by water from the water side of the pet dish. A similar pet food dish is disclosed in the East patent, U.S. Pat. No. 5,277,149, in which a single solid or liquid food receptacle is removably suspended from a movable pedestal disposed within a larger lower bowl filled with water and acting as a moat.

Although each of the above prior art pet food containers function as designed to varying extent, each is burdened with inherent limitations. Kasselman and Partelow both utilize a water moat and suspended food receptacles there above with reverse inclined walls to inhibit travel of crawling insects; however, these devices are fairly complex in design and difficult to assemble and mold manufacture in mass. Carpenter and East, on the other hand, are relatively simple in structure and design and relatively easy to mass mold, but provide only a water moat as a barrier to ant travel. In virtually all moat designed pet dishes, it is observed that ants sooner or later manage to swim or build a bridge across the moat, and invariably manage to find means to attack the pet food.

While the above illustrated devices may be appropriate for their intended purpose and usage at the time, none of the foregoing inventions and patents, taken either singly or in combination, is observed to suggest, anticipate or describe the invention disclosed herein as claimed.

Therefor, there remains a long standing and yet unfulfilled need for a pet food dish for adaptation to out of doors use in such manner that ants and similar insects are effectively excluded from trespassing, and such a bowl that is relatively simple in design for ease in use, assembly, and manufacturer in large numbers. It is urged that water moats surrounding a pet food container alone and even in addition to reverse inclined walls of the moat and food containers will not suffice to eliminate insect infestation of existing pet food containers. The invention disclosed herein suggests yet another new and novel approach to eliminating the limitations of the foregoing described and other related prior art.

SUMMARY OF THE INVENTION

The pet food dish disclosed herein describes an article of manufacture that may be conveniently made in great numbers from a single mold. The invention describes a double bowl dish where a centrally disposed island feed dish is surrounded by a water moat contained by an encompassing outer bowl. The rim of the feed dish island is serrated in the manner of a half square wave or sine wave as is the rim of the outer bowl on the other side of the moat. The cycle of the wave on the inner island rim, however, is configured to be exactly 90 degrees out of phase with the cycle of the wave on the rim of the outer bowl in such manner that when the inner island rim is high, the outer bowl rim is low. By such means, it is understood that an ant attempting to cross the moat by the shortest route of travel directly across the water, would initially find the journey a bit confusing and challenging because the ant would have to travel from a high bank to a low bank or from a low bank to a high bank. As an added incumbrance to a trespassing ant, the outer bowl containing the moat is provided with a water inlet and outlet which is coupled to a typical drip system to provide means for causing the water in the moat to flow in a continuous manner through the moat to further frustrate and inhibit ants from building ant bridges across the moat.

OBJECT OF THE INVENTION

It is therefor a primary object of the invention to provide for a domestic pet food dish with crawling insect barriers and inhibiting characteristics specifically designed for out of doors use.

A more specific object of the invention is to provide a pet food dish with a water moat surrounding the food retaining bowls disposed therein wherein the rims of the bowls are provided with serrated or square wave edges in the manner of that of a castle turret and wherein the square wave on one side of the moat is 90 degrees out of phase with that on the other side of the moat whereby an ant attempting to bridge or swim the moat would have to go in its traditional most direct route across the body of water from a low position to a high position and vice versa.

Still another object of the invention is to provide an insect inhibiting pet food dish particularly designed for outside applications and having a water moat surrounding a central food receptacle wherein there is additionally provided in said dish means for keeping a constant flow of water through the moat to further frustrate and inhibit crawling insects from traversing the moat to get to the food island disposed therein.

The foregoing and other less obvious objects of the invention will become more readily apparent upon viewing the attached drawing in view of the detailed description of a preferred embodiment herein and in light of the appended claims.

DETAILED DESCRIPTION OF A PREFERRED EMBODIMENT

Figure 1:
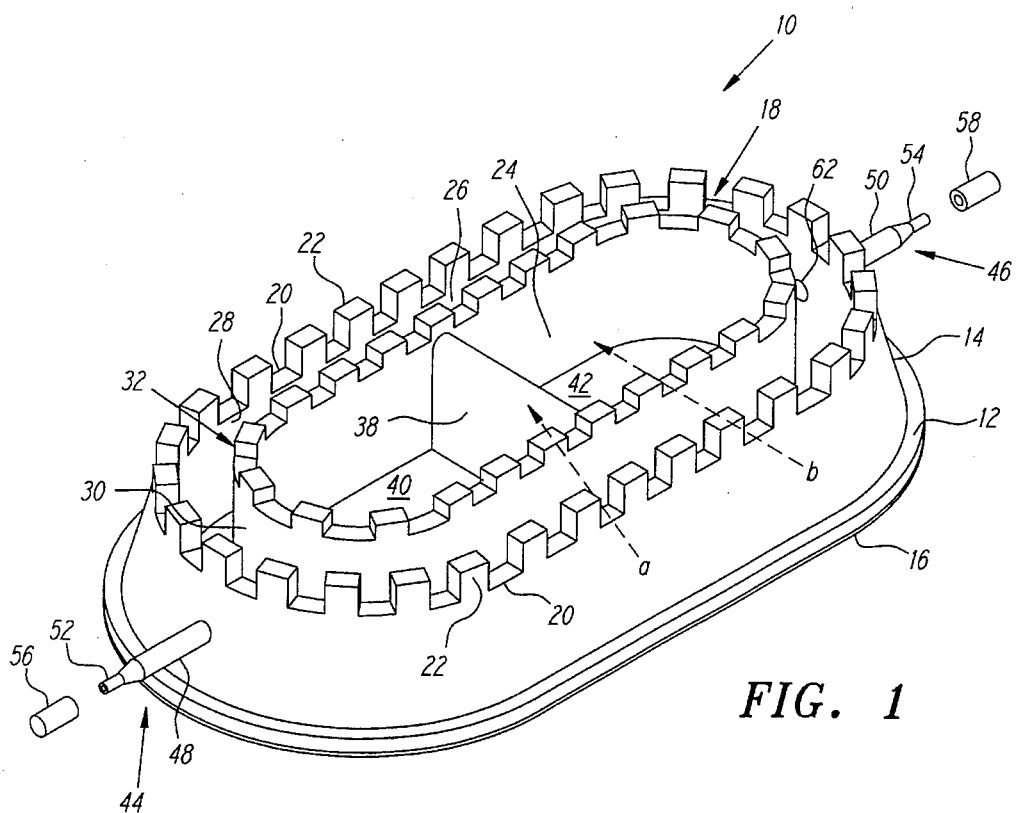
FIG. 1 illustrates a perspective view of the invention.
Figure 2:
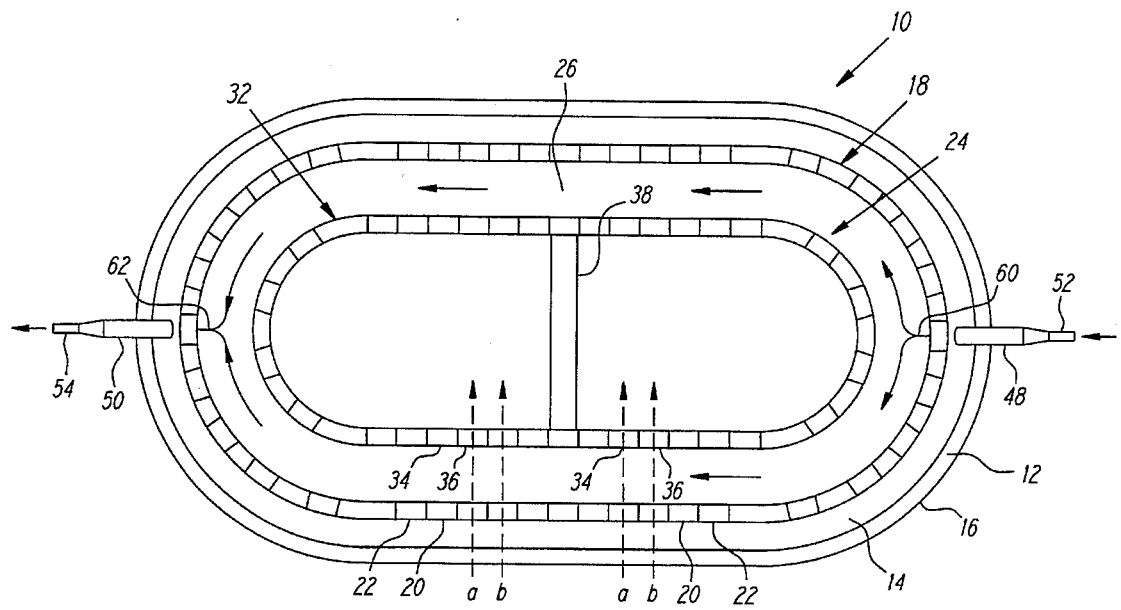
FIG. 2 illustrates a top, plan view of the invention with food therein indicating the path of travel of water through the dish and attempted course of travel of ants through serrated barriers.
Figure 3A:
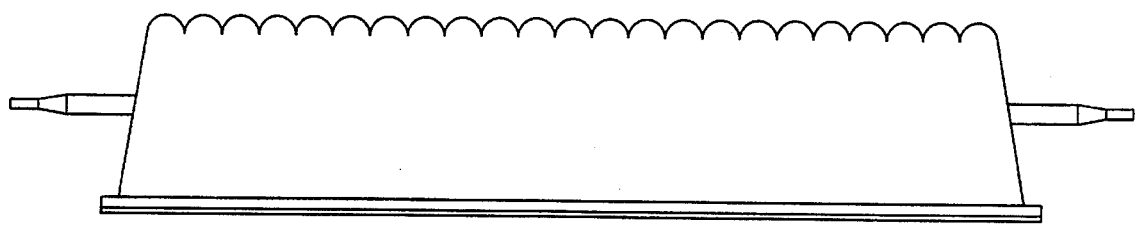
FIG. 3a illustrates a side elevational view disclosing a corrugated, half sine wave, rolled design of the rim edge.
Figure 3B:
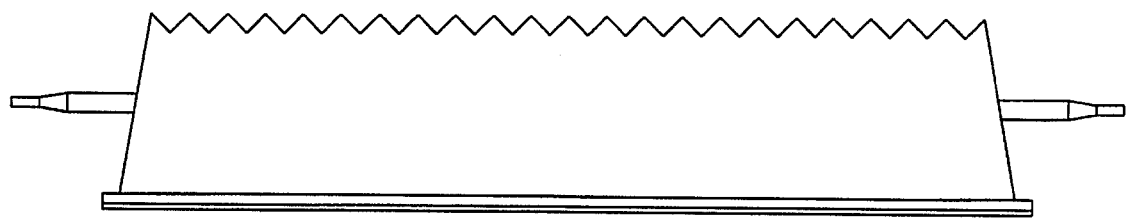
FIG. 3b illustrates a side elevational view disclosing an alternate design of a serrated rim edge.
Figure 3C:
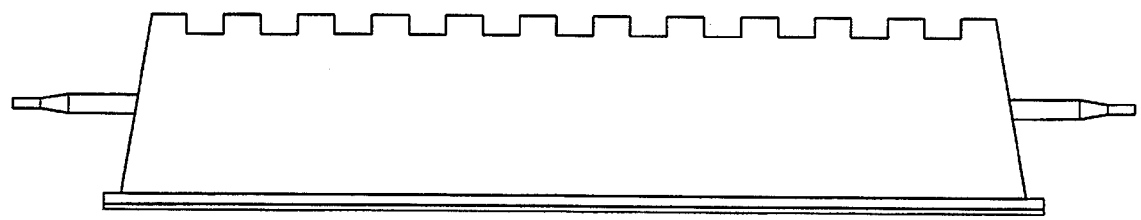
FIG. 3c illustrates a side elevational view disclosing another alternated square wave design of the rim edge.

Referring now to FIGS. 1 and 2, a perspective illustration and plan view, respectively, of the pet food tray invention is generally referred to as 10. Food tray 10 may be constructed from virtually any non porous material such as metal, nonmetal, glass or ceramic, but is conceived to be preferably molded from a non breakable plastic or rubberized type substance to permit large scale molding, manufacture and production at low cost per unit.

In the preferred embodiment of FIG. 1, an oval shaped base 12 of tray 10 is provided with inclined sides 14 for esthetic appearance as well as for the added benefit of a lowered center of gravity and resulting increased stability of the unit. It will be noted that although food tray 10 is illustrated as an oval shape in FIG. 1, it will be apparent that the external and internal shape thereof may equally as well be circular, rectangular or any of a variety of other polyhedron shapes as desired. Base 12 may also be provided with a non slip rubber pad 16 or similar material on the bottom of base 12, and futher having a roughened surface with particular attributes of a non skid nature.

Oval base 12 is further provided with a similar oval shaped rim 18 on the upper edge of inclined side 14 thereof and has a serrated, rolled, corrugated or castle type design appearance consisting of alternating high 20 and low 22 level elements. Castle elements 20 and 22 not only impart a unique, novel and ornamental appearance to dish 10, but also provide an additional insect barrier as will be discussed below.

A similar shaped oval, food dish 24 is centrally positioned within base 12 to create a channel 26 into which water may be maintained to create a moat 26 between the external base 12 and the internal, island food dish 24 as the primary insect barrier of the invention. Island food dish 24 is preferably molded as an integral part of base 12 for ease of mass manufacture and promotion, but may also be fabricated as a snap in component to base 12. Vertical walls 28 and 30 of moat 26 are preferably in the realm of one to two inchs in depth and separated by approximately one to two inches in breadth for the preferred water moat barrier, but may vary in depth and breadth depending on need and overall size of food tray 10.

Island food dish 24 is also provided with a serrated, corrugated or castle shaped upper rim 32 with high 34 and low 36 level elements in like manner as with base rim 18. It is of great import, however, that the alternating pattern of food dish rim 32 be offset from the identical alternating pattern of base rim 18; i.e. low level 20 is directly opposite high level 34, and high level 22 is directly opposed low level 36. By such means, it can be observed that an insect, for example an ant, that would by instinct attempt to travel the shortest route to a food scent via route a or b in FIG. 1, as the most direct path, to attempt to build a bridge or to swim across moat 26 would encounter the differential elevational level of each bank of the moat as an additional inhibiting barrier to travel should the ant manage to swim the moat. That is to say that embarking from a high bank 22 and landing on a low bank 36, or embarking from a low bank 20 and encountering a high bank 34 would add more confusion to an ant making the trip across the moat via routes a and b, respectively, and would tend to thereby subtely deter the ant from choosing that or any similar course of travel over moat 26.

Although food dish 24 may be a single compartment, in the preferred embodiment, dish 24 is further provided with a partition 38 to separate dish 28 into two compartments for at least two different types of food, or for a liquid in a first compartment 40 and a solid in a second compartment 42. In the preferred embodiment, partition 38 is formed from a single mold process in fabricating island food dish 24 and base 12 to yield the total pet food tray 10; however, partition 38 may likewise be a snap-in type element.

Pet food tray 10 is provided with yet another insect barrier in the manner of a constant flow of water through moat 26. It has been observed that dispite similar moat elements of other related pet food trays, ants have been observed to occasionally build a bridge across the stagnent water of moat 26 across which the rest of the ant kingdom can travel. It is a significant element of the invention herein disclosed that a continuous flow of water be provided through moat 26 to further inhibit ants and other insects from crossing the moat by providing an inlet port 44 and exit port 46. Inlet and exit ports 44 and 46 consist of tubes 48 and 50, respectively, with nippled ends 52 and 54 over which water tight caps 56 and 58 may be applied for protection in shipment and for general water sealants if the water flow process is not being utilized. It is envisioned that in certain environments, the flowing moat process may not be as feasible as a stationary moat. The inlet port 60 and exit port hole 62 in moat 26 can be seen in FIGS. 1 and 2. It should be further apparent that although water is illustrated in FIG. 1 as flowing from left to right, it may equally as well flow from right to left as illustrated in the top, plan view of FIG. 2.

Although the foregoing description delineates in some detail an enabling disclosure of a best mode and preferred embodiment of the invention to best enable one to understand, make and use the invention concept, it should be appreciated that many obvious modifications and alterations of the above described invention can be made without departing from the spirit and scope of the invention concept. Accordingly, it is intended that all such modifications be considered within the ambit of the invention as limited and defined only by the appended claims which may be interpreted in view of the drawing and the above desclosure.

I claim:

1. A pet food dish configured to inhibit crawling insect contamination, comprising:

a base tray having a generally concave upper surface adapted to hold a volume of liquid, said base tray having a first rim, said first rim comprising alternating relatively high and low domains; and a food island having a generally concave upper surface adapted to hold a volume of pet food, said food island having a second rim, said second rim comprising alternating relatively high and low domains, said food island being centrally disposed within said base tray to thereby form a moat between said first and second rims, respectively, wherein said relatively high domains on said first rim correspond in position to said relatively low domains on said second rim.

2. The pet food dish of claim 1, said base tray further comprising a fluid inlet port and a fluid outlet port, said fluid inlet port and said fluid outlet port each communicating with said moat such that a circulating fluid flow may be maintained therein.

* * * * *